RECORDING MEDIUM TRANSPORT MECHANISM

Filed April 18, 1961 4 Sheets-Sheet 1

Inventors
WILLI DRAHEIM
KARL MÖHL
McGlew and Toren
ATTORNEYS

Inventors
WILLI DRAHEIM
KARL MÖHL
McGlew and Toren
ATTORNEYS

Inventors
WILLI DRAHEIM
KARL MÖHL
McGlew and Toren
ATTORNEYS

Jnventors:
WILLI DRAHEIM
KARL MÖHL
McGlew and Toren
ATTORNEYS

United States Patent Office 3,077,315

Patented Feb. 12, 1963

3,077,315
RECORDING MEDIUM TRANSPORT MECHANISM

Willi Draheim, Kirchheim, Unter Teck, and Karl Möhl, Bissingen, Teck, Germany, assignors to Bolkow-Entwicklungen Kommanditgesellschaft, Ottobrunn near Munich, Germany Filed Apr. 18, 1961, Ser. No. 103,840
Claims priority, application Germany Apr. 23, 1960
12 Claims. (Cl. 242—55.12)

This invention relates in general to recording devices and in particular to a new and useful driving and braking mechanism for a recording device for dictating purposes having two individually driven reels for transporting the recording medium.

The present invention is particularly concerned with a recording medium transport mechanism which includes a pair of reels which are supported on individual discs which are separately driven from frictional engagement with a driving member or friction wheel means. In the operation of this driving mechanism it is essential that one or the other of the discs be separated from driving engagement with the friction wheel means for effecting forward or reverse winding as desired and in other instances it is necessary to provide for the driving of both discs in order to effect their simultaneous stopping by braking. The present invention is an improvement over prior art constructions principally in the construction and arrangement of the driving and braking mechanism and to the improved means for operating the same.

In accordance with the present invention there is provided a novel driving mechanism which includes a single driving shaft having friction wheels engageable selectively with an associated one of a pair of rotatable disc supporting members for reels of the recording medium. The arrangement includes a lever mechanism for disassociating one of the discs from its friction driving wheel for the purposes of effecting winding of the recording medium on the opposite reel and for a similar disengagement of the opposite reel when the first reel is in driving engagement with the friction wheel. In addition, means are provided for instantaneously braking each of the discs by effecting the stopping of rotation of the driving mechanism.

A feature of the invention is that keys are provided for effecting wind or rewind and stopping or starting of the mechanism as desired. The keys are arranged to move one or the other of two levers which are pivotally mounted at a location to move the selected supporting reel disc out of its driving position. The key mechanism advantageously includes a locking arrangement to insure that the mechanism remains in the operative position selected.

In order to achieve a remote control reversal of direction of the recording medium driving disc, an electromagnetic means is employed for displacing a rocking arm mechanism to effect the driving of one of the supporting discs for the reel of recording medium as the other is moved out of engagement with its driving means in accordance with the rotational movement of the recording medium which is selected. The remote control mechanism operates without changing the switch position of the keys which are associated with the mechanism for manual operation thereof.

A feature of the invention is that the frictional driving wheels are arranged on a common axle and are provided with a flywheel mass to achieve good running properties. Since it is not feasible to brake the flywheel mass by bringing both frictional wheels into frictional contact with the associated recording medium supporting discs, the invention includes a brake magnet which prevents rotation of the flywheel mass when the current has been disconnected from the apparatus, such as by operating one of the keys.

Accordingly, it is an object of this invention to provide an improved driving mechanism for a recording medium transport system.

A further object of the invention is to provide an improved driving and braking mechanism for a recording unit having two separate reels upon which the medium is wound and unwound.

A further object of the invention is to provide an improved recording medium transport mechanism including a pair of rotatable discs upon which the reels of recording medium are disposed for driving rotation thereof and a friction drive wheel for each disc which are mounted on a common axle for continuous rotation and including means for disassociating a selected disc from its friction driving wheel.

A further object of the invention is to provide an improved recording medium transport mechanism having a plurality of keys for effecting wind and unwind by moving a supporting disc for a reel of the transport mechanism into and out of association with a rotating friction wheel.

A further object of the invention is to provide a transport mechanism for a recording medium which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 1:
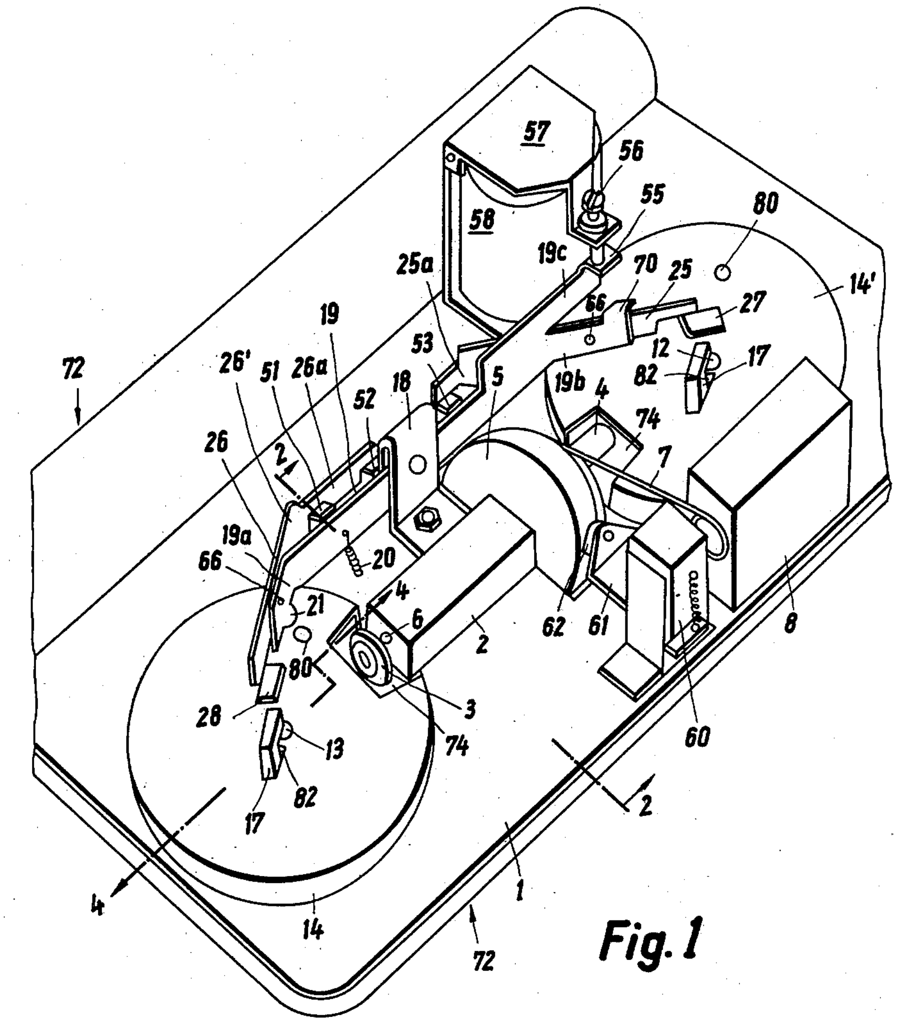
FIG. 1 is a bottom perspective view of the chassis of a magnetic recording device having a driving and braking mechanism constructed in accordance with the invention.
Figure 2:
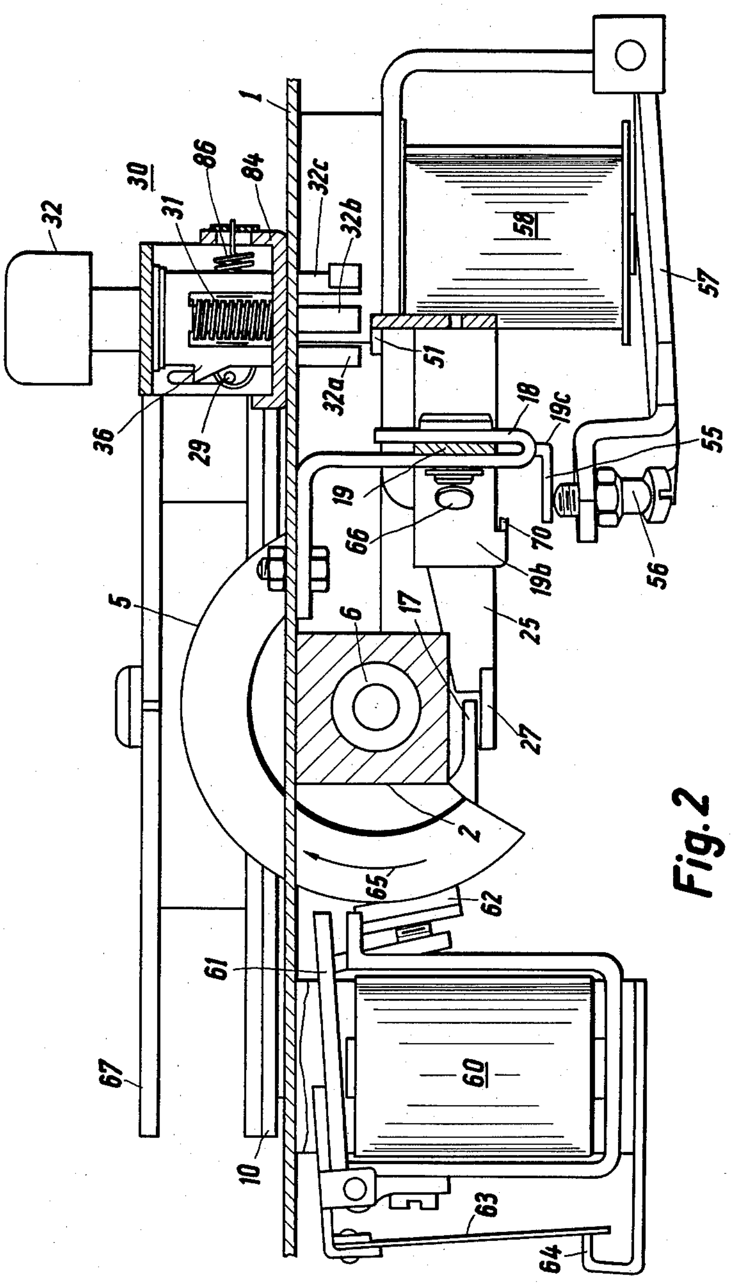
FIG. 2 is an upright section taken in the vicinity of line 2—2 of FIG. 1.

Referring to the drawings in particular, the invention embodied therein includes a magnetic recording device generally designated 72 having a mounting plate 1, the underside of which is indicated in FIG. 1. Affixed to the mounting plate 1 is an elongated bearing block 2 in which a driving shaft 6 is rotatably mounted. The shaft 6 carries a frictional driving wheel 3 at one end and a frictional driving wheel 4 at the opposite end. The shaft 6, is rotated by means of a small motor 8 which drives the shaft 6 by means of a belt 7. The rotation of the shaft is clockwise as indicated in FIG. 2.

In accordance with the invention, the supporting plate 1 is provided with cylindrical depressions (elevations as seen in the inverted view in the drawings) 14 and 14' having cutaway opposite segmental portions 74 and 74 provided to accommodate friction wheels 4 and 3, respectively.

Figures 3, 4:
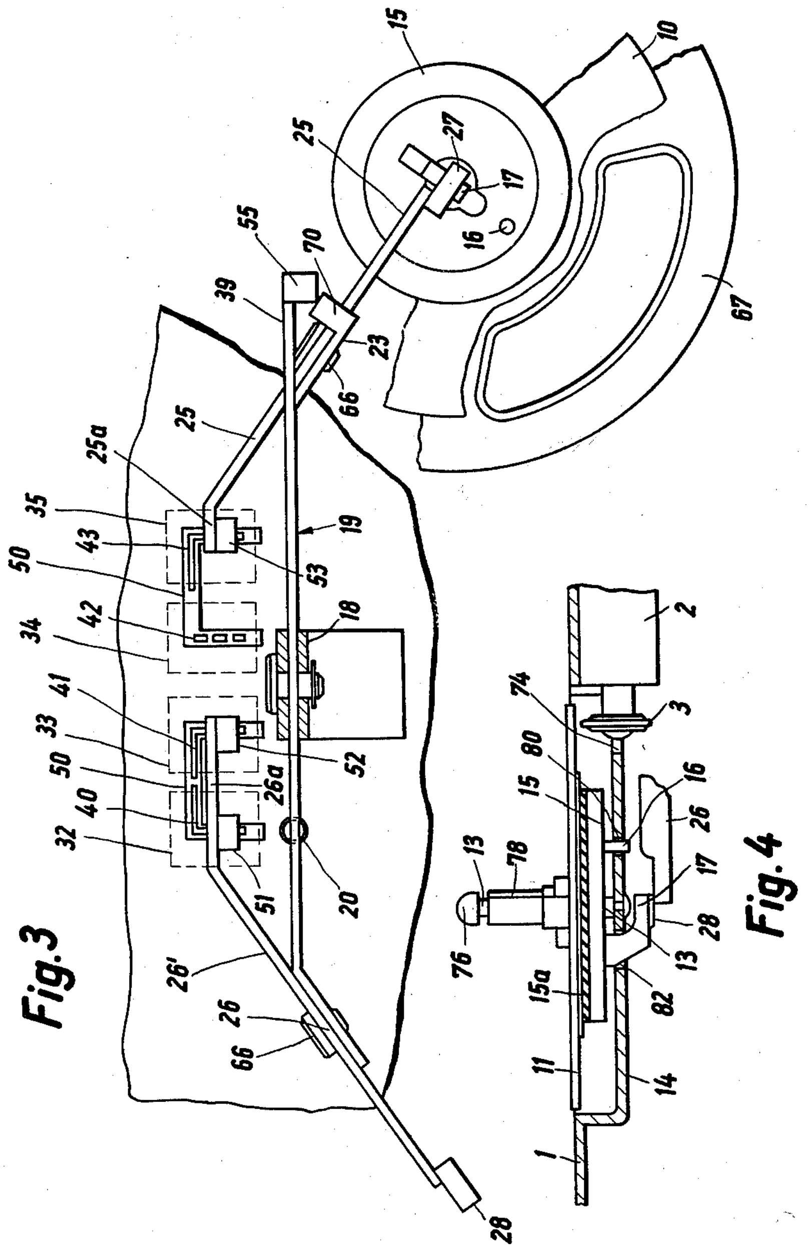
FIG. 3 is a bottom plan view of the lever-carrying rocker mechanism for adjusting the drive of the reel supporting discs.
FIG. 4 is a fragmentary section taken on the line 4—4 of FIG. 1 but in an upright position.

As indicated in FIG. 4, a shaft rivet member 13 is secured to the plate 1 and carries an associated recording medium reel supporting disc 11 having a bearing 78 and which is disposed for axial and rotatable movement on the supporting shaft 13. Further a disc 10 is disposed for axial and rotatable movement on a similar supporting shaft 12 (FIG. 1) secured to the plate 1. Both the associated discs 11 and 10 are rotatable and axially displaceable on the supporting shafts 13 and 12 and may fall by gravity, unless prevented from doing so, downwardly on the supporting shafts 13 and 12 into contact with the associated driving wheel 3 or 4. In the position indicated in FIG. 4, the disc 11 is held in a raised inoperative position by mechanism to be described more fully hereinafter. The top of the supporting shaft 13 is provided with a dome-shaped head 76.

Each of the discs 11 and 10 is supported on a plate 15 therebeneath having a felt ring 15*a* facing the reel disc to permit some relative rotatable movement of the disc 11 and the plate 15. A guide pin 16 extends through an opening 80 defined in the depression 14 and guides the plate 15 for vertical reciprocatory movement. When the bottom of the plate 15 is resting on the bottom of the depression the disc 11 is supported on the friction wheel 3 for driving rotation thereby. Plate 15 also carries an angled member or nose 17 which fits through an opening 82 in the recessed portion 14 and is provided for engagement by mechanism for the purposes of manipulating the disc 11 into and out of driving engagement with the friction wheel 3. The same arrangement is made for disc 10.

On the supporting plate 1 is also secured a bearing plate or bracket 18 having an upstanding portion on which is pivoted a rocker arm member generally designated 19. A spring 20 is secured to the support plate 1 at one end and to the rocker arm 19 at another end and biases an angled outer end 19*a* of the rocker arm in a direction toward the depression 14. In the position indicated in FIG. 1, the driving mechanism is not operable. The rocker arm end 19*a* has a lower projection 21 which rests on the bottom surface of the depression 14. The portion 19*a* and a similar 45° angled portion 19*b* on the opposite end of the rocker arm carry an operating lever or crank 26 and 25, respectively. The operating levers 25 and 26 are pivotally connected to their associated arms by means of pivot members 66. The lever arm 26′ includes a straight portion 26*a* having projections 51 and 52 defined at the lower edges thereof which are actuatable by key members to be described more fully hereinafter. The lever 25 includes a straight portion 25*a* which has a projection 53 at its lower edge which cooperates with another key member in similar fashion. The opposite ends of the operating levers 25 and 26 have flat projecting portions 27 and 28 which contact the noses 17 of the plates 15, to raise and lower them for disconnecting and connecting, respectively, the discs 11 or 10 to the associated driving wheels 3 or 4.

Figure 5:
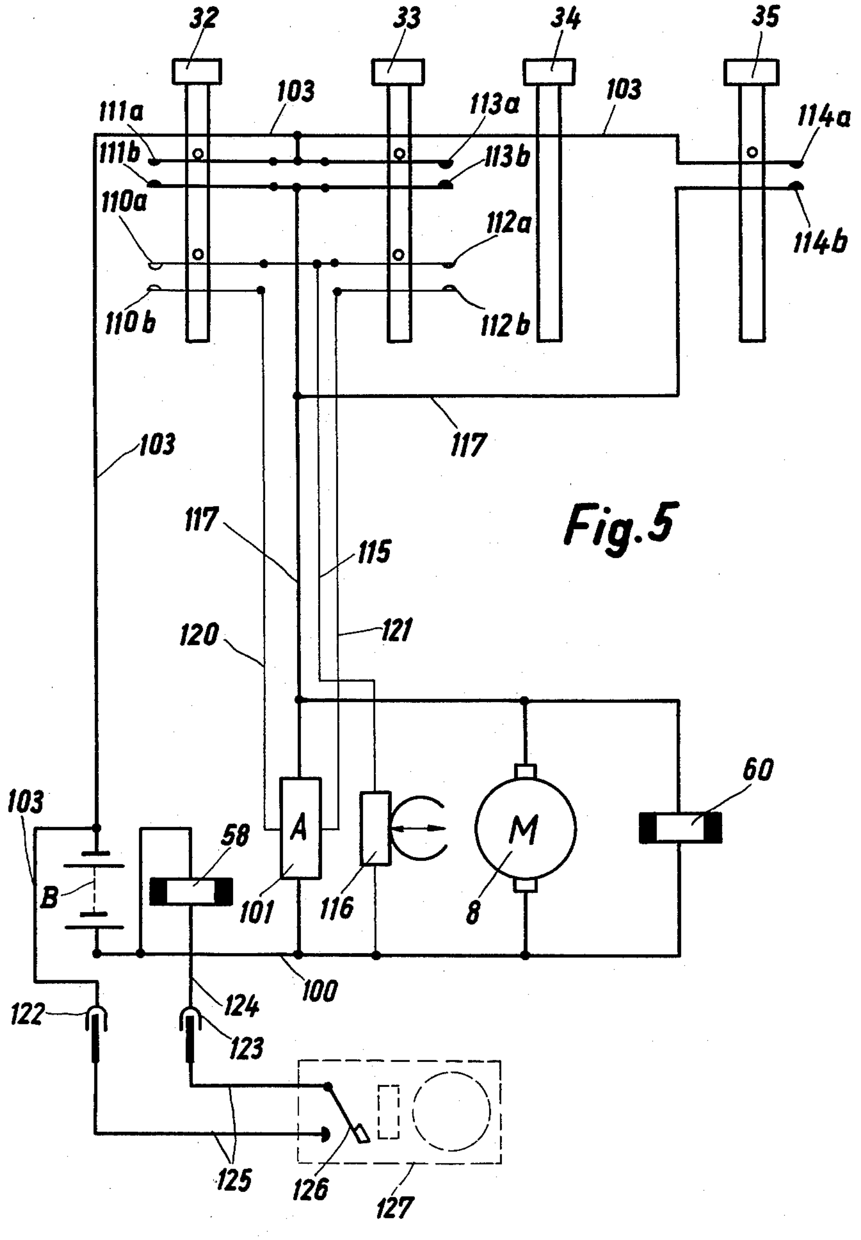
FIG. 5 is a schematic illustration of a wiring diagram for the electrical control.

In FIG. 2 there is indicated in elevation a key 32 of a key unit generally designated 30 which includes keys 32, 33, 34 and 35 as indicated in FIG. 3 and FIG. 5. The key 32 includes a plurality of depending arm portions 32*a*, 32*b* and 32*c*, the central one of which, 32*b*, includes a compression spring 31 which is biased between a bracket portion 84 on the top of the supporting plate 1 and a bifurcated central portion of the key to raise the key in an upward or inactive position. A locking bent 29 is provided which is engageable over the end of a nose 36 after the key 32 is depressed to hold the key in a downward operative position. A spring 86 secured to an upstanding portion of the bracket 84 biases the bent 29 in a clockwise direction to cause the bent 29 to move over the edge of the nose 36 when the key is depressed. Each key has a lowermost edge designated 40, 41, 42 and 43, respectively, which protrudes through slots 50 arranged in the plate 1 (FIG. 3) and cooperates with extensions 51 and 52 of lever 26 and with extension 53 of lever 25; whereby keys 32 and 33 cooperate with extensions 51 and 52 and key 35 cooperate with extension 53. The locking mechanism 29 operates with each of the keys 32, 33 and 35 so that when one of these keys is pressed down it is held in a pressed down position. The key 34, however, is provided with a semi circular extension (not shown) which—when key 34 is pressed down—becomes effective to move the bent 29 out of its engaging position with the nose 36 of a depressed key.

As indicated in FIGS. 2 and 1, the rocker 19 includes further an extending portion 19*c* terminating in a flat extension 55 which is disposed in alignment with an adjusting screw 56 formed at the end of an armature 57 of an electromagnetic member 58. Actuation of the electromagnetic member 58 causes the upward movement of the armature 57 to rock the rocker 19 clockwise to raise the end 19*a* off the depressed portion 14. By this means remote control operation can be effected to move the nose 17 upwardly by contact of the parts 70 and 27 to free the disc 10 and permit driving of the disc 11 to be described more fully hereinafter.

Another electromagnetic 60 is provided with an armature 61 which carries a brake shoe 62 arranged on the underside of the supporting plate 1 opposite the flywheel mass 5. A spring 63 is secured on the armature 61 and bears on a support 64 of the electromagnet 60 and holds the armature 61 and thus the brake shoe 62 in the position indicated in FIG. 2.

Electrical controls are provided which are connected to the actuating button and each of the electromagnets 58 and 60 and the motor 8.

A battery B, as shown in FIG. 5, has one pole connected to a conductor 100 leading to the electromagnet 60, the motor 8, an amplifier 101, a recording and reproducing head 116 and the electromagnet 58. The other pole of this battery is connected to conductors 103 leading to conacts 111*a*, 113*a* and 114*a*. The contacts 111*b*, 113*b* and 114*b* are interconnected and are connected by a conductor 117 to the other terminals of the magnet 60, the motor 8 and the amplifier 101.

With its other terminal part the recording and reproducing head 116 is, through a conductor 115, connected to the contacts 110*a* and 112*a* which are interconnected. Furthermore contacts 110*b* and 112*b* with conductors 120 and 121 are connected to the input and output, respectively, of the amplifier 101. Conductor 103 finally leads to a socket contact 122. A further socket contact 123 is connected to the electromagnet 58 through a conductor 124. Through a cord line 125, the plug contacts lead to a switch 126 arranged in a microphone-box 127 which, in this case, has been represented only schematically, this microphone-box being equipped with further switching arrangements for remote-controlling the recording device 72, as they are required for a tape recorder, for instance. These further switching arrangements have not been represented.

If the switch 126 is closed, the electromagnet 58 is supplied with current through the conductors 103, 125 and 100. While being supplied with current, the electromagnet 58 moves the foresaid rocker arm 19 (FIG. 1) in a way which will be described later on.

By actuating the recording key 32 the contacts 111*a*, 111*b*, 110*a* and 110*b* are closed, the motor 8, the electromagnet 60 and the amplifier 101 thus being switched in. The recording and reproducing head 116 is connected to the amplifier input through the closed contacts 110*a* and 110*b*. By actuating the reproducing key 33 the contacts 113*a*, 113*b*, 112*a* and 112*b* are closed, whereby the motor 8, the electromagnet 60 and the amplifier 101 are switched in. The recording and reproducing head 116 is connected to the amplifier-output through the closed contacts 112*a* and 112*b*. Actuating the rewinding key 35 will, through contacts 114*a* and 114*b*, only swing in the motor 8 and the electromagnet 60. The key 34 which serves only for the release of the keys 32, 33 and 35 already described, does not require any electrical contacts.

The method of operation of the arrangement described above is as follows: When the recording key is pressed down, for example, the key 32, it is held in a pressed down position by the locking bent 29 against the action of the spring 31. The motor 8 is started by actuation of contacts 111*a* and 111*b* by the key 32 and the connection between battery B and the amplifier 101 and the recording head 116 is established by contacts 110*a* and 110*b* and the electromagnet 60 is excited. The electromagnet causes attraction of its armature 61 and release of the flywheel mass 5 so that the latter moves in a direction of the arrow 65 as indicated in FIG. 2.

At the same time the lever 26 is pivoted about its pivot 66 by the base 40 of the depressed key 32 (see FIGS. 1 and 3). Flat portion 28 of lever 26 contacts the nose 17 to cause it to raise the plate 15 with the disc 11 upwardly and out of frictional engagement with the friction wheel 3. The reel disc 10 is not affected by the pivotal movement of the lever 26 and is therefore driven by the friction wheel 4. The friction wheel 4 advantageously has a much smaller diameter than the friction wheel 3 so that the driving speed is materially different. The reel disc 10 is then rotated with low speed to wind the recording medium on the reel 67 which is attached thereto or positioned thereon as indicated in FIG. 3.

By actuating the stop key 34 which cooperates with the locking bent 29 the key 32 is released and brought into the rest position indicated in FIG. 2. As the current supply is then interrupted by the opened contacts 110*a*/110*b* the driving operation of the disc 10 is terminated. In addition, the lever 26 is released so that the reel disc 11 moves down together with the plate 15 by their own weight into frictional contact with the friction wheel 3. Both reel discs 10 and 11 are now in frictional contact with the associated friction wheels 3 and 4 and rotated thereby so that the reels of recording medium are stopped directly without the tape being tangled. At the same time the electromagnet 60 has also become deactivated and the spring 30 moves the brake shoe 62 into the position indicated in FIG. 2 and brakes the flywheel mass 5. Since the brake shoe 62 in respect to the direction of rotation of the flywheel mass is so selected that self-locking occurs, the flywheel mass stops immediately after the electromagnet has been deactivated.

When the rewinding key 35 is pressed down it is locked in its lowest position by the clamping mechanism 29. It activates through its base 43 the extension 53, and thus the lever 25. The reel disc 10 is lifted by the extension 27 of the lever 25 acting on the nose 17 of the plate 15 and thus taken out of frictional contact with the friction wheel 4. The lever 26 is not influenced and thus the reel disc 11 is maintained in frictional contact with its friction wheel 3. The motor 8 is started by the closed contacts 114*a* and 114*b* of the depressed key 35 and moves the reel disc 11 to cause now rapid rewinding of the recording medium reel. Since the electromagnet 60 has also been excited when the motor was started the flywheel mass 5 can move freely in the direction of the arrow 65. The disconnection of the operating state can be effected by the key 34 in the manner described previously or by one of the keys 32 or 33. In the latter case there is a change in the operating state since the device is switched electrically from rapid rewinding to recording and reproduction.

In order to achieve a remote control reversal of direction of the recording medium reel on the reel disc, an electromagnet 58 is provided, as previously described. If the apparatus is set for recording, for example, key 32 is actuated and the reel disc 11 is in the non-driven position represented in FIG. 4. If the electromagnet 58 is actuated briefly by closing the contact 126, for example for repetition, the latter moves its armature 57 and the rocker 19 by the adjusting screw 56 and the widened portion 55 against the action of the spring 20 toward the plate 1. The lever 26 connected with the rocker arm 19 moves away from the supporting plate 1 for a distance until the reel disc 11 comes into frictional contact with the friction wheel 3 by its own weight. At the same time, however, the lever 25 connected with the other end of the rocker arm 19 has been moved by the extension 70 against the chassis and has lifted via the extension 27 and the nose 17 the reel disc 10, taking it out of frictional engagement with the friction wheel 4. The reels for the recording medium which are positioned on the reel discs are now driven in the opposite direction. When the magnet 58 becomes deactivated the spring 20 returns the rocker 19 into the position represented in FIG. 1 so that the reel disc 11 is again taken out of frictional contact with the frictional wheel 3 by means of the lever 26. The reel disc 10 drops again by its own weight and comes into frictional engagement with wheel 4. Hereby the key 32 maintains its original setting.

Thus, the invention provides a driving and braking mechanism for a recording medium transport mechanism which permits easy changes of the operating state of the device by means of keys or by means of a remote control arrangement such as a microphone for dictating purposes.

While a specific embodiment of the invention has been shown and described in detail to illustrate the application of the invention principles, it will be understood that the invention may be embodied otherwise without departing from such principles.

What is claimed is:

1. A recording medium transport mechanism comprising first and second recording medium reel supporting means, means mounting said supporting means permitting to and fro movement thereof between driven and idling positions, driving means engageable with each of said supporting means in the driven position thereof, first and second pivoted lever means, respectively associated with said first and second supporting means, selectively rockable to move the associated supporting means to the idling position, respective setting means for selectively rocking said lever means to move a selected supporting means to, and maintain it in the idling position, a rocker arm pivotally mounted between said supporting means, said lever means being pivotally mounted on opposite ends of said rocker arm, and means for rocking said rocker arm to bodily move one of said lever means which has been selectively rocked by its associated setting means in a direction to move its associated supporting means to the driven position independently of its associated setting means, and to bodily move the other lever means to move its associated supporting means to the idling position.

2. A recording medium transport mechanism according to claim 1, wherein each reel supporting means includes a disc member.

3. A recording medium transport mechanism according to claim 1, wherein the means mounting each reel supporting means includes an upright supporting shaft providing for vertical reciprocation of said supporting means.

4. A recording medium transport mechanism according to claim 2, wherein said driving means includes first friction wheel means engageable with the disc member of said first reel supporting means and second friction wheel means engageable with the disc member of said second reel supporting means.

5. A recording medium transport mechanism according to claim 4, wherein said first and second driving friction wheel means are mounted on a common shaft.

6. A recording medium transport mechanism according to claim 1, wherein each setting means includes a movable key member selectively engageable with one end of its associated lever, the other end of its associated lever being engageable with the associated supporting means.

7. A recording medium transport mechanism according to claim 1, wherein said means for rocking said rocker arm include remotely controlled means engageable with said rocker arm for rocking said rocker arm to bodily move said first and second lever means for actuating the associated reel supporting means.

8. A recording medium transport mechanism according to claim 1, wherein each recording medium supporting means includes a disc, a rotary shaft having a pair of friction wheels thereon respectively engageable with the discs of said first and second reel supporting means, said mounting means supporting said discs for vertical reciprocation and rotation thereon, said discs being displaceable downwardly under the influence of gravity into contact with the associated friction wheel to effect rotation of said discs.

9. A recording medium transport mechanism according to claim 8, wherein each supporting disc includes a supporting plate under the disc having a felt portion in contact with the underside of the disc, each supporting plate being displaceable into engagement with the associated friction wheel to provide for rotation of each supporting disc by its associated friction wheel.

10. A recording medium transport mechanism according to claim 1, wherein each of said setting means comprises a key movable to rock its associated lever, means locking each key in the operative position, and a third key operable to release said locking means.

11. A recording medium transport mechanism as claimed in claim 10, wherein one of said first-mentioned keys is a record-reproduce key and the other thereof is a rewind key, said rocker arm being aligned with said record reproduce key and rockable thereby for bodily moving said lever means after operation of the lever means associated with the record-reproduce key to effect rewinding of the recording medium while said rocker arm is so rocked.

12. A recording medium transport mechanism according to claim 7, including biasing means urging said rocker arm in one direction and wherein said remotely controlled means comprises an electromagnet having a movable armature connected to said rocker arm and effective to rock the latter in a direction against the force of said biasing means, and remote switch means selectively operable to connect said electromagnet to a source of electric potential.

References Cited in the file of this patent

UNITED STATES PATENTS

| | | |
|---|---|---|
| 2,091,756 | Fodor | Aug. 31, 1937 |
| 2,706,637 | Cain | Apr. 19, 1955 |
| 2,951,914 | Dubois | Sept. 6, 1960 |